Oct. 9, 1928.
J. Y. AINSA
1,687,419
DIRECTION INDICATOR
Filed March 22, 1926   2 Sheets-Sheet 1
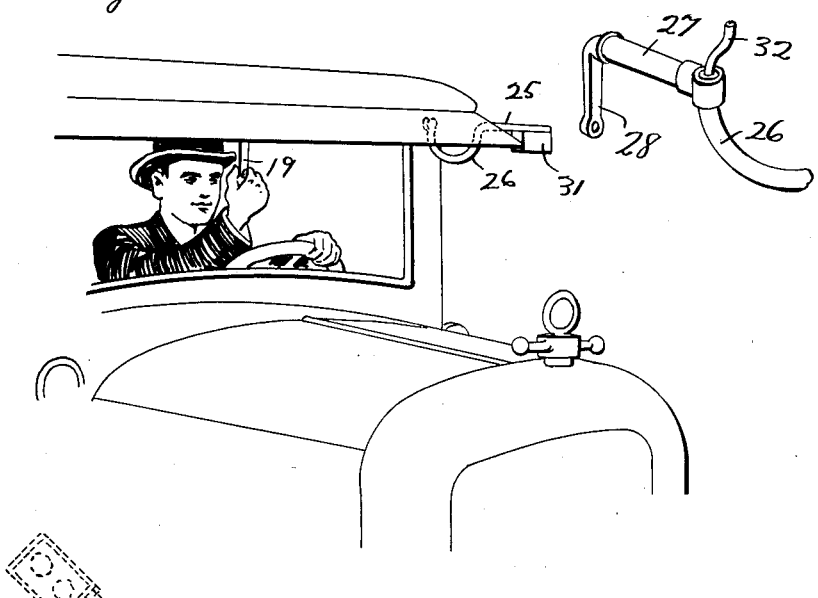
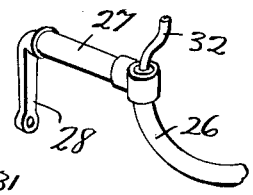
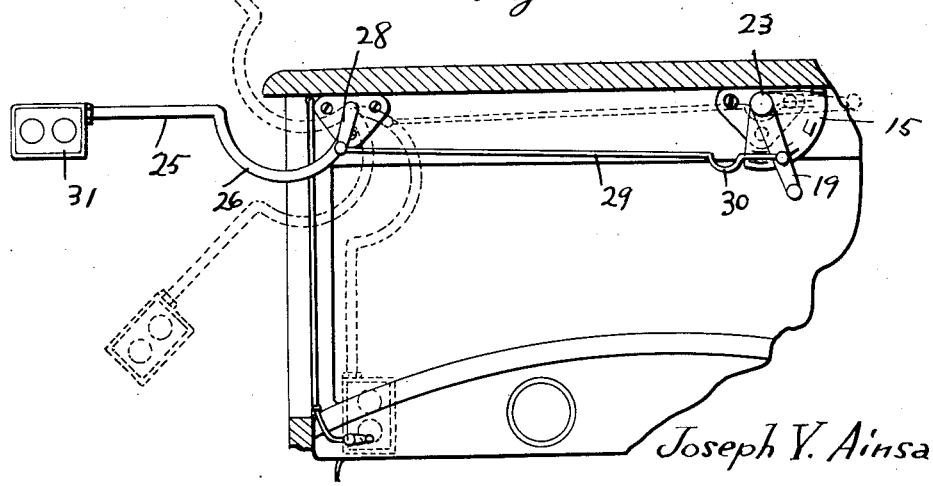
Joseph Y. Ainsa
INVENTOR
BY Victor J. Evans
ATTORNEY
WITNESS: Gerald Hennesy

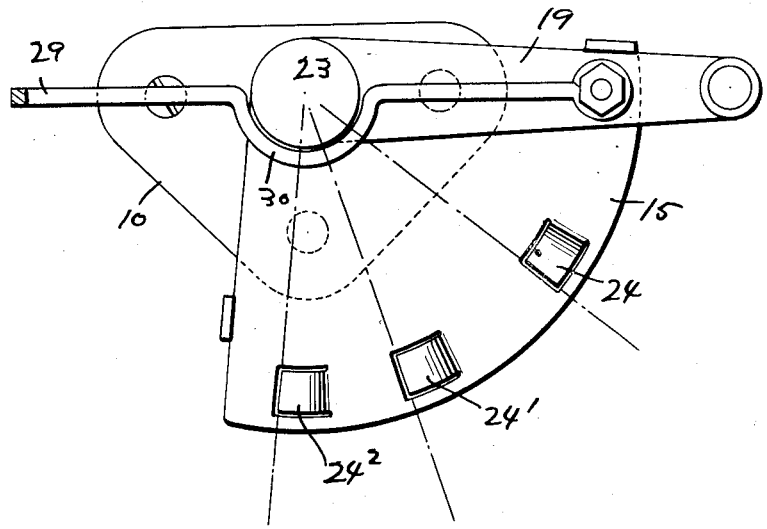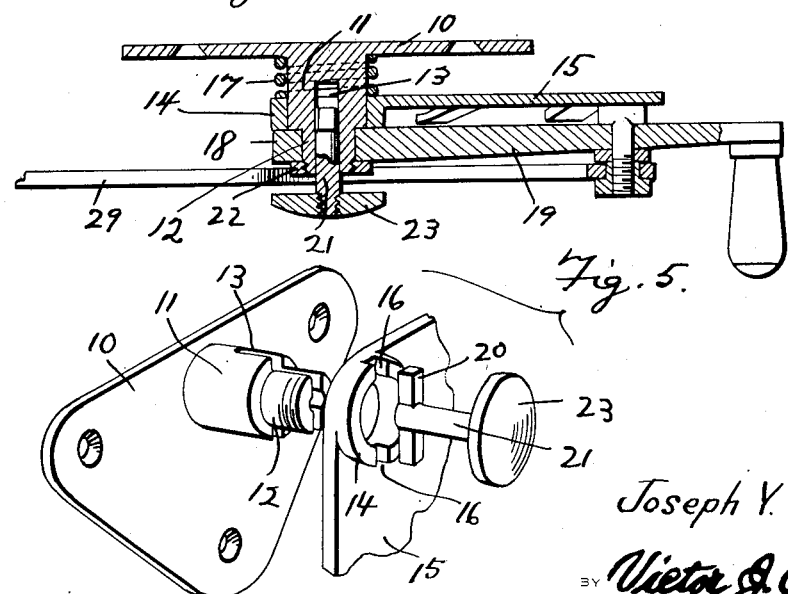

Patented Oct. 9, 1928.

1,687,419

UNITED STATES PATENT OFFICE.

JOSEPH Y. AINSA, OF MORENCI, ARIZONA.

DIRECTION INDICATOR.

Application filed March 22, 1926. Serial No. 96,590.

This invention relates to improvements in indicators for use upon motor vehicles for indicating the intentions and direction of travel to be taken by a preceding vehicle.

Another object of the invention residing in the provision of a manually operated crank arm positioned within the vehicle and within convenient reach of the driver and in turn being associated with a rod connected with an offset lever mounted upon the vehicle and carrying an illuminated signal upon its outer end and capable of being moved to the various positions relevant to the inclinations of a signal indicating the direction of travel to be taken by such vehicle.

A further object of the invention residing in the provision of a locking plate for the manually operated crank arm having a release shaft included within the mounting therefor and which when depressed will release the crank arm from the locking plate whereby the signal may drop down to its normal position.

With the above and other objects in view, the invention further includes the following novel features and details of construction, to be hereinafter more fully described, illustrated in the accompanying drawings and pointed out in the appended claims.

In the drawing:—

Figure 1 is a fragmentary portion of an automobile illustrating the manner in which the invention is applied and operated thereon.

Figure 2 is a transverse section taken through a portion of the vehicle and illustrating the mountings and operations of the invention thereon.

Figure 3 is a front elevation of the operating mechanism.

Figure 4 is a sectional view thereof.

Figure 5 are perspectives of the release mechanism for the manually operated crank arm.

Figure 6 is a fragmentary perspective of the operating arm to the signal.

Referring to the drawings in detail, wherein like characters of reference denote corresponding parts, the reference character 10 indicates an attaching plate arranged within the motor vehicle above the windshield and directly in advance and convenient reach of the motor vehicle driver and having an inwardly extending tubular member 11 provided thereon and including a reduced exteriorly threaded portion 12, each of which having a registering transversely disposed slotted portion 13 provided therein, as clearly illustrated in Figures 4 and 5 of the drawings. Received upon the tubular member 11 is an enlarged apertured portion 14 provided in one corner of a quadrant-shaped locking plate 15 and having diametrically opposed cutout portions 16 provided in the opposite sides thereof, the purpose of which will be presently apparent. A compression spring 17 encircling the tubular member 11 and normally forcing and holding the locking plate 15 in the position, as noted in Figure 4 of the drawing, while the latter being restricted as to movement in an opposite direction by the mounting of the inner end portion 18 of a crank arm 19 which in turn holding the transversely disposed key 20 provided upon the inner end of a release pin 21 within the transversely disposed slotted portion 13 provided in the tubular member 11 and reduced exteriorly threaded portion 12 and within the diametrically opposed cutout portion 16 provided within the enlarged apertured portion 14 of the locking plate 15 when followed by a nut such as indicated at 22 upon the outer reduced exteriorly threaded portion 12. The outer end of the release pin 21 having a disc 23 provided thereon to facilitate the depressing of the latter at the will of the motor vehicle operator. The outer surface of the locking plate 15 adjacent the crank arm 19 having a plurality of spring fingers 24, 24' and 24² struck thererfrom at spaced intervals adjacent the curved edge therefor for holding the said crank arm 19 in desired positions thereon. A hollow operating arm such as indicated at 25 providing a semi-circular portion 26 provided adjacent its inner end and having a bearing shaft 27 extending inwardly therefrom and having a lever 28 secured to its opposite end within the vehicle and associated with one end of a connecting rod 29 having its opposite end pivotally secured at an appropriate point in the length of the manually operated crank arm 19 and which also provides a semi-circular portion 30 at an appropriate point in its length in order that the said rod 29 when moved to the position, as clearly illustrated in Figure 3 of the drawings, will have ample and sufficient clearance from the disc 23 carried upon the outer end of the release pin 21 and offering no resistance to the operation thereof. The outer extremities of the operating arm 25 having an illuminated signalling or lamp box 31 secured thereto and receiving its source of electrical energy from the motor vehicle storage battery through a conducting wire 32 extending through the operating rod 25.

In the mode of operation of the present invention it is clearly apparent and manifest that the manually operated crank arm 19 may be moved downwardly from its normal position as clearly illustrated in Figure 3 of the drawing adjacent one of the struck and upstanding spring fingers 24, 24' and 24² respectively to oscillate the connecting arm 29 transversely of the vehicle or swinging the operating arm 25 to the various dotted line positions as indicated in Figure 2 of the drawings to give a correct signal as to the direction of travel or intentions of the driver of a preceding or approaching vehicle. It is to be noted that the various spring fingers will hold the manually operated crank arm 19 in the various positions and relevant to the dotted line positions of the operating arm 25.

When the signal has been given and the motor vehicle conducted in pursuance thereto the disc 23 provided upon the outer free end, the release pin 21 is then depressed in order that the key 20 provided upon the forward end thereof, being normally fitted and received within the cutout portions 16 provided within diametrically opposite sides of the enlarged portion 14 of the locking plate 15 will move the locking plate 15 rearwardly, as a whole, against the tension of the compression spring 17 whereby the particular spring finger will be released from contacting engagement with the manually operated crank arm 19 whereby the operating arm 25 of its own weight and the additional weight of the illuminated signal box 31 carried upon its outer end will move downwardly and cause the connecting rod or arm 29 to rotate and swing the manually operated crank arm 19 to its normal inactive position as clearly illustrated in Figure 3 of the drawing. It is to be noted from the operation of the invention that the manually operated crank arm 19 has now a slight movement to bring the latter into engagement with the particular spring finger relevant to the signal given and does not distract nor in any way interfere with the driving of the vehicle other than the removing of one hand from the motor vehicle steering wheel for a brief interval.

The invention is susceptible of various changes in its form, proportions and minor details of construction, and the right is herein reserved to make such changes as properly fall within the scope of the appended claims.

Having thus described the invention, what is claimed is:—

1. A device of the character described comprising an attaching plate, a tubular portion carried thereby provided with cut-out portions, a locking plate provided with spring fingers, a compression spring interposed therebetween, a collar carried by the locking plate mounted upon the tubular portion having cut-out portions registering with the cut-out portions in the tubular portion, a crank arm journaled upon the tubular portion adapted to engage said fingers, and a release mechanism for the crank arm.

2. A device of the character described comprising an attaching plate, a tubular portion carried thereby provided with cut-out portions, a locking plate provided with spring fingers struck at spaced intervals thereon, a compression spring interposed between the attaching and locking plates, a collar carried by the locking plate mounted upon and having cut-out portions registering with the cut-out portions in the tubular portion, a crank arm journaled upon the tubular portion and adapted to be held in a desired position by the spring fingers, and a release pin provided with a horizontally disposed key adapted for reception within the aforementioned cut-out portions to impart sliding movement to the collar upon the tubular portion to release the spring fingers from locking engagement with the crank arm.

In testimony whereof I affix my signature.

JOSEPH Y. AINSA.